(12) United States Patent
Willemain et al.

(10) Patent No.: US 6,205,431 B1
(45) Date of Patent: Mar. 20, 2001

(54) SYSTEM AND METHOD FOR FORECASTING INTERMITTENT DEMAND

(75) Inventors: Thomas Reed Willemain, Niskayuna, NY (US); Charles Nelson Smart, Belmont, MA (US)

(73) Assignee: Smart Software, Inc., Belmont, MA (US)

( * ) Notice: Subject to any disclaimer, the term of this patent is extended or adjusted under 35 U.S.C. 154(b) by 0 days.

(21) Appl. No.: 09/182,249

(22) Filed: Oct. 29, 1998

(51) Int. Cl.[7] .................................................. G06F 17/60

(52) U.S. Cl. ............................................. 705/10; 705/28

(58) Field of Search ............................... 705/1, 7, 10, 28, 705/29; 700/90, 91

(56) References Cited

U.S. PATENT DOCUMENTS

| | | | |
|---|---|---|---|
| 5,657,453 | * 8/1997 | Taoka et al. | 395/201 |
| 5,819,232 | * 10/1998 | Shipman | 705/8 |
| 5,946,662 | * 8/1999 | Ettl et al. | 705/8 |
| 5,953,707 | * 9/1999 | Huang et al. | 705/10 |
| 6,006,196 | * 12/1999 | Feigin et al. | 705/10 |
| 6,032,125 | * 2/2000 | Ando | 705/10 |

FOREIGN PATENT DOCUMENTS

| | | |
|---|---|---|
| 0770967A2 | * 5/1997 | (WO) . |
| WO98/45796 | * 10/1998 | (WO) . |

OTHER PUBLICATIONS

Anonymous, "Sometimes All It Takes Is a Smart Idea," Manufacturing Systems, vol. 7, No. 7, pp. 18–19, Jul. 1988.*

Smart Software, "SmartForecasts(TM) Version 3 Powers Up Forecasting Line," News Release, p. 1, Nov. 1992.*

Ferranti, Marc, "Forecasting Trio Polishes Data Handling," PC Week, vol. 10, No. 2, p. 35(2), Jan. 1993.*

Barney, Doug, "Forecasts Software to Keep Drugs on Haitian Hospital's Shelves," InfoWorld, vol. 15, No. 31, p. 25, Aug. 1993.*

"Smart Software," Windows Magazine, vol. 8, No. 2, p. 62, Feb. 1997.*

Hoover, Jim, "SmartForecasts for Windows," International Journal of Forecasting, vol. 15, No. 4, pp. 451–459, Oct. 1999.*

Smart Software Web Site, "NEW Intermittent Demand Forecasting Technology Emerges From National Science Foundation Study," Retrieved from <http://www.smartcorp.com/News/n9809.stm>, Aug. 1998.*

Smart Software Web Site, "New $$-Saving Technologies are Unique to Market," Retrieved from <http://www.smartcorp.com/news/n9910.stm>, Oct. 1999.*

Smart Software Web Site, "SmartForecasts for Windows(TM) NEW Version 5 Features Patented Intermittent Demand Forecasting," Retrieved from <http://www.smartcorp.com/News/sp9811.stm>, Oct. 1999.*

"Smart Software Brings New Forecasting Technologies to Market," Business Wire, p. 0406, Oct. 1999.*

Smart Software Web Site, Various information concerning SmartForecasts Version 5, Retrieved on Feb. 24, 2002 from Internet <URL: http://www.smartcorp.com>, Feb. 2000.*

SmartForecasts Version 4 Manual.

SmartForecasts Version 5.0 Manual.

(List continued on next page.)

*Primary Examiner*—Eric W. Stamber
*Assistant Examiner*—Susanna Meinecke-Diaz
(74) *Attorney, Agent, or Firm*—Hoffman, Warnick & D'Alessandro LLC

(57) ABSTRACT

A system and method for forecasting intermittent demand. The forecasting technique utilizes sample reuse techniques to build a distribution of predicted cumulative lead time demand values that can be analyzed using statistical methods, be used as input for an inventory control system, be used as input for a sales planning system, etc.

46 Claims, 10 Drawing Sheets

OTHER PUBLICATIONS

SmartForecasts Version 3 Manual.

SmartForecasts Version 4.1 Manual.

"An Introduction to the Bootstrap," Bradley Efron and Robert Tibshirani, DATE, Chapter 2 excerpt—pp. 10–16 and Chapter 6 excerpt—pp. 45–104.

The Annals of Statistics, "The Jacknife and the Bootstrap's for General Stationary Observation," vol. 17, No. 3, pp. 1217–1241, 1989.

Journal of the American Statistical Association, "The Stationary Bootstrap," vol. 89, No. 428, pp. 1303–1313, Dec. 1994.

Decision Sciences and Engineering Systems, Rensselaer Polytechnic Institute, "The Threshold Bootstrap and Threshold Jackknife," Daesu Park and Thomas R. Willemain, Technical Report No. 37–97–461, 1997.

Bookbinder et al., "Estimation of Inventory Re–Order Levels Using the Bootstrap Statistical Procedure," IIE Transactions, vol. 21, No. 4, pp. 302–312, Dec. 1989.

Carlstein, "The Use of Subseries Values for Estimating The Variance of a General Statistic From a Stationary Sequence," The Annals of Statistics, vol. 14, No. 3, pp. 1171–1179, 1986.

Sherman, et al., "Replicate Histograms," American Statistical Association Journal of the American Statistical Association, vol. 91, No. 434, pp. 566–576, Jun. 1996.

Lall et al., "A Nonparametric Wet/Dry Spell Model for Resampling Daily Precipitation," Water Resources Research, vol. 32, No. 9, pp. 2803–2823, Sep. 1996.

Brillinger et al., "New Directions in Time Series Analysis—Part I," Springer–Verlag, pp. 75–85, 1992.

* cited by examiner

| COMPANY | A | B | C | D | E | F | G | H | I |
|---|---|---|---|---|---|---|---|---|---|
| DATA FEATURES | | | | | | | | | |
| # SERIES | 8363 | 1000 | 4654 | 967 | 611 | 237 | 1464 | 1058 | 10184 |
| #OBS/SERIES | 29 | 54 | 60 | 24 | 62 | 27 | 36 | 60 | 36 |
| % ZERO VALUES | | | | | | | | | |
| MEAN | 49 | 75 | 84 | 67 | 93 | 47 | 85 | 65 | 93 |
| STD DEV | 29 | 17 | 20 | 17 | 8 | 36 | 13 | 25 | 5 |
| MAXIMUM | 100 | 98 | 98 | 88 | 100 | 100 | 100 | 98 | 100 |
| 75 %ILE | 76 | 89 | 97 | 79 | 98 | 85 | 94 | 85 | 97 |
| 50 %ILE | 48 | 80 | 92 | 71 | 95 | 41 | 89 | 75 | 94 |
| 25 %ILE | 21 | 63 | 82 | 58 | 92 | 11 | 78 | 48 | 89 |
| MINIMUM | 3 | 9 | 0 | 8 | 37 | 4 | 22 | 2 | 56 |
| AVERAGE OF NONZERO DEMANDS | | | | | | | | | |
| MEAN | 54 | 5 | 2777 | 815 | 19 | 10 | 2 | 32 | 1 |
| STD DEV | 305 | 46 | 43202 | 1680 | 29 | 15 | 2 | 170 | 1 |
| MAXIMUM | 5827 | 1393 | 930000 | 25665 | 250 | 106 | 35 | 3969 | 9 |
| 75 %ILE | 13 | 3 | 12 | 789 | 23 | 10 | 2 | 12 | 2 |
| 50 %ILE | 4 | 2 | 4 | 306 | 9 | 4 | 1 | 5 | 1 |
| 25 %ILE | 2 | 1 | 2 | 117 | 4 | 2 | 1 | 2 | 1 |
| MINIMUM | 1 | 1 | 1 | 1 | 1 | 1 | 1 | 1 | 1 |
| CV OF NONZERO DEMANDS | | | | | | | | | |
| MEAN | 72 | 58 | 40 | 96 | 66 | 65 | 45 | 83 | 21 |
| STD DEV | 40 | 40 | 46 | 41 | 34 | 45 | 36 | 38 | 25 |
| MAXIMUM | 437 | 294 | 364 | 343 | 163 | 312 | 261 | 315 | 111 |
| 75 %ILE | 91 | 72 | 71 | 117 | 89 | 83 | 64 | 102 | 40 |
| 50 %ILE | 67 | 53 | 34 | 92 | 67 | 61 | 43 | 78 | 0 |
| 25 %ILE | 47 | 36 | 0 | 69 | 44 | 31 | 18 | 60 | 0 |
| MINIMUM | 0 | 0 | 0 | 0 | 0 | 0 | 0 | 0 | 0 |

NOTE: RESULTS ROUNDED TO ZERO DECIMALS.

*FIG. 6*

| DATASET | LEAD TIME | # OF SERIES | EXPO SMOOTH | CROSTON'S METHOD | SUBSERIES NORMAL | SUBSERIES LogNORMAL | BOOTSTRAP |
|---|---|---|---|---|---|---|---|
| A | 1 | 8335 | 2481 | 2853 | 556 | 94 | 43 |
| B | 1 | 999 | 602 | 648 | 5 | 8 | 9 |
| C | 1 | 4633 | 3747 | 4896 | 95 | 72 | 50 |
| D | 1 | 967 | 559 | 561 | 27 | 30 | 32 |
| E | 1 | 598 | 493 | 586 | 8 | 12 | 10 |
| F | 1 | 219 | 143 | 131 | 55 | 42 | 18 |
| G | 1 | 1446 | 1068 | 1210 | 5 | 4 | 4 |
| H | 1 | 1058 | 778 | 760 | 86 | 156 | 100 |
| I | 1 | 9758 | 7758 | 10706 | 48 | 43 | 6 |
| A | 3 | 8333 | 1239 | 1935 | 956 | 226 | 130 |
| B | 3 | 999 | 495 | 537 | 122 | 91 | 65 |
| C | 3 | 4571 | 3504 | 6130 | 179 | 113 | 175 |
| D | 3 | 967 | 569 | 555 | 246 | 161 | 193 |
| E | 3 | 570 | 416 | 526 | 61 | 49 | 29 |
| F | 3 | 214 | 157 | 203 | 130 | 98 | 61 |
| G | 3 | 1378 | 628 | 770 | 32 | 29 | 44 |
| H | 3 | 1057 | 739 | 706 | 303 | 330 | 259 |
| I | 3 | 9608 | 4244 | 9277 | 104 | 113 | 228 |
| A | 6 | 8332 | 2768 | 4646 | 3823 | 3607 | 3030 |
| B | 6 | 998 | 339 | 385 | 271 | 198 | 168 |
| C | 6 | 4484 | 3333 | 7987 | 366 | 241 | 388 |
| D | 6 | 951 | 924 | 1109 | 1220 | 1070 | 790 |
| E | 6 | 539 | 360 | 559 | 122 | 117 | 67 |
| F | 6 | 211 | 236 | 118 | 196 | 194 | 110 |
| G | 6 | 1278 | 422 | 563 | 167 | 149 | 176 |
| H | 6 | 1055 | 778 | 839 | 954 | 579 | 528 |
| I | 6 | 9347 | 2838 | 10239 | 265 | 254 | 441 |

*FIG. 7*

| DATASET | LEAD TIME | # OF SERIES | CROSTON'S METHOD | SE | SUBSERIES NORMAL | SE | SUBSERIES LogNORMAL | SE | BOOTSTRAP | SE |
|---|---|---|---|---|---|---|---|---|---|---|
| A | 1 | 8335 | -0.08 | 0.01 | 0.23 | 0.01 | 0.32 | 0.01 | 0.35 | 0.01 |
| B | 1 | 999 | -0.05 | 0.03 | 0.48 | 0.06 | 0.51 | 0.06 | 0.59 | 0.06 |
| C | 1 | 4633 | -0.02 | 0.03 | 0.70 | 0.04 | 0.72 | 0.04 | 0.82 | 0.03 |
| D | 1 | 967 | 0.05 | 0.05 | 0.40 | 0.06 | 0.46 | 0.06 | 0.51 | 0.06 |
| E | 1 | 598 | -0.14 | 0.07 | 1.03 | 0.12 | 1.03 | 0.12 | 1.05 | 0.12 |
| F | 1 | 219 | 0.26 | 0.14 | 0.84 | 0.20 | 0.88 | 0.21 | 1.14 | 0.20 |
| G | 1 | 1446 | 0.03 | 0.02 | 0.53 | 0.05 | 0.55 | 0.05 | 0.57 | 0.05 |
| H | 1 | 1058 | 0.03 | 0.06 | 0.73 | 0.09 | 0.94 | 0.10 | 1.03 | 0.10 |
| I | 1 | 9758 | -0.06 | 0.01 | 0.70 | 0.02 | 0.70 | 0.02 | 0.70 | 0.02 |
| A | 3 | 8333 | -0.21 | 0.01 | 0.07 | 0.01 | 0.13 | 0.01 | 0.22 | 0.01 |
| B | 3 | 999 | 0.02 | 0.02 | 0.17 | 0.04 | 0.27 | 0.04 | 0.42 | 0.05 |
| C | 3 | 4571 | -0.05 | 0.04 | 1.00 | 0.05 | 1.04 | 0.05 | 1.11 | 0.05 |
| D | 3 | 967 | 0.13 | 0.07 | 0.29 | 0.09 | 0.37 | 0.09 | 0.55 | 0.09 |
| E | 3 | 570 | -0.09 | 0.09 | 0.88 | 0.11 | 0.87 | 0.11 | 0.99 | 0.12 |
| F | 3 | 214 | -2.85 | 0.46 | 0.23 | 0.16 | 0.30 | 0.16 | 0.38 | 0.15 |
| G | 3 | 1378 | 0.13 | 0.04 | 0.17 | 0.06 | 0.20 | 0.06 | 0.30 | 0.06 |
| H | 3 | 1057 | -0.03 | 0.07 | 0.44 | 0.08 | 0.71 | 0.09 | 0.81 | 0.08 |
| I | 3 | 9608 | -0.15 | 0.01 | 0.42 | 0.02 | 0.42 | 0.02 | 0.45 | 0.02 |
| A | 6 | 8332 | -0.32 | 0.02 | 0.01 | 0.02 | 0.01 | 0.02 | 0.17 | 0.02 |
| B | 6 | 998 | 0.01 | 0.04 | 0.07 | 0.05 | 0.13 | 0.06 | 0.28 | 0.05 |
| C | 6 | 4484 | -0.04 | 0.06 | 1.39 | 0.07 | 1.45 | 0.07 | 1.51 | 0.07 |
| D | 6 | 951 | 0.31 | 0.09 | 0.07 | 0.12 | 0.16 | 0.12 | 0.57 | 0.11 |
| E | 6 | 539 | 0.01 | 0.13 | 0.77 | 0.15 | 0.83 | 0.15 | 1.06 | 0.15 |
| F | 6 | 211 | -0.12 | 0.08 | -0.14 | 0.06 | -0.09 | 0.07 | 0.01 | 0.07 |
| G | 6 | 1278 | 0.24 | 0.05 | 0.04 | 0.07 | 0.06 | 0.07 | 0.14 | 0.06 |
| H | 6 | 1055 | 0.06 | 0.07 | 0.24 | 0.09 | 0.52 | 0.09 | 0.66 | 0.09 |
| I | 6 | 9347 | -0.36 | 0.02 | 0.16 | 0.02 | 0.16 | 0.02 | 0.21 | 0.02 |

NOTE: REFERENCE LIKELIHOOD FROM EXPONENTIAL SMOOTHING.

*FIG. 8*

SYSTEM AND METHOD FOR FORECASTING INTERMITTENT DEMAND

Background Art

1. Technical Field

The present invention relates to forecasting and inventory control, and more particularly, relates to forecasting intermittent demand.

2. Related Art

In many of today's competitive commercial activities, such as manufacturing and retail, inventory management is increasingly becoming recognized as one of the most important operational concerns. In particular, by maintaining precise inventory levels, a business entity can eliminate the need to manufacture, purchase, and/or store goods that are not immediately required. In order to achieve such goals, an inventory management system must have the ability to accurately forecast demand in order to predict inventory requirements.

One particular type of demand forecasting that is especially difficult to predict involves that of "intermittent demand," which is characterized by frequent zero values intermixed with nonzero values. Intermittent demand patterns are found in various situations, such as those dealing with spare parts, or the sale of "big ticket" items. A typical intermittent demand data set will generally represent a series of requirements for a particular part over a period of time. For example, a parts supplier will typically track a monthly demand for each of their parts. Over a particular time span, for example 18–36 months, it may be apparent that demand for each part exists only during a few of the months. Thus, the demand history, on a month-by-month basis, would reflect that most of the monthly demand values were zero, while a small minority were nonzero. Because most intermittent demand series have no trend or seasonality, and because the nonzero values can greatly vary, forecasting future demand based on such historical data has in the past involved nothing more than oversimplified and relatively inaccurate statistical methods. In turn, this makes it difficult to provide an effective inventory management system.

In general, demand forecasting involves using historical data to predict future requirements over some "lead time" L, for example, four months. The predicted requirements over the lead time is generally provided as a distribution and referred to as the lead time demand (LTD). Existing techniques used to forecast intermittent demand include single exponential smoothing and Croston's method. Single exponential smoothing forecasts assume the distribution of lead time demand to be described by a normal (i.e., Gaussian or "bell-shaped") curve and use a smoothing process to estimate the mean and variance of the distribution. The total demand is regarded as normal, being the sum of L random variables that are independent and identically distributed. Of course, the normality assumption is unlikely to be strictly true, especially for short lead times that do not permit central limit theorem effects for the sum.

Below is an example of one possible method for implementing single exponential smoothing. In this example, the mean and variance of the assumed normal distribution of LTD may be computed as follows. The mean level of demand at time t, M(t), may be computed using $$M(t)=\alpha X(t)+(1-\alpha)M(t-1), t=1 \ldots T,$$

where X(t) is the observed demand in period t and $\alpha$ is a smoothing constant between 0 and 1. For each inventory item, $\alpha$ may be computed, for example, by a grid search in steps (e.g., 0.05), and then selecting the value of $\alpha$ that minimized the sum of squared residuals $\Sigma(X(t)-M(t))^2$, t=1 . . . T. The smoothing may then be initialized using the average of the first two demands, $$M(0)=(X(1)+X(2))/2.$$

The mean of the L demands over the lead time is estimated as L·M(T). The common variance, V, is estimated from the one step ahead forecast errors using $$V=(1/T)\cdot\Sigma(X(t)-M(t-1))^2, t=1 \ldots T.$$

Finally, assuming independent and identically distributed demands, the variance of the LTD distribution is estimated as L·V.

Croston's method was developed to provide a more accurate estimate of the mean demand per period. Given this alternative estimate of the mean and the resulting estimate of the variance, Croston's method also assumes that LTD has a normal distribution.

Croston's method estimates the mean demand per period by applying exponential smoothing separately to the intervals between nonzero demands and their sizes. Let I(t) be the smoothed estimate of the mean interval between nonzero demand. Let S(t) be the smoothed estimate of the mean size of a nonzero demand at time t. Also let q be a counter for the interval between nonzero demands. Croston's method works as follows:

If $X(t)=0$, then $S(t)=S(t-1)$ $I(t)=I(t-1)$ $q=q+1$, else $S(t)=\alpha X(t)+(1-\alpha)(S(t-1))$ $I(t)=\alpha q+(1-\alpha)I(t-1)$ q=1, where X(t) is the observed demand at time t. Combining the estimates of size and interval provides the estimate of mean demand per period $$M(t)=S(t)/I(t).$$

These estimates are only updated when demand occurs. When demand occurs every review interval, Croston's method is identical to conventional exponential smoothing, with S(t)=M(t). Croston's method can be initialized using the time until the first event and the size of the first event. As with exponential smoothing, the mean of the L demands is estimated over the lead time as L·M(T), the variance of the LTD distribution is L·V, and LTD is assumed normal.

While these methods have provided some solution to the forecasting of intermittent data, the level of accuracy remains fairly low in most real world applications. In particular, these methods focus on estimating the mean demand, and generally provide only an inaccurate estimate of the entire forecast distribution. Accordingly an improved system for forecasting intermittent demand is required.

SUMMARY OF THE INVENTION

The present invention provides systems and methods for forecasting intermittent demand over a lead time. First, a bootstrap methodology is provided that includes the steps of: (1) providing a data set of intermittent data comprising a predetermined number of historical demand values; (2) calculating/forecasting lead time demand values over the lead time, wherein the calculating step comprises the step of randomly sampling or selecting values from the historical demand values; (3) summing the lead time values to provide a lead time demand value sum; (4) repeating the calculating and summing steps a predetermined number of times to provide a distribution of lead time demand value sums; and (5) statistically analyzing the distribution and/or inputting the distribution into an inventory control system.

The invention also comprises a computer program for forecasting lead time demand based on intermittent data, comprising: (1) a mechanism for examining the intermittent data; and (2) a mechanism for generating a plurality of series of lead time demand values, wherein each series of lead time demand values is based upon at least one random selection or sampling from among values contained in the intermittent data. The program further comprises a mechanism for summing the lead time demand values within each set of lead time values to provide a distribution of lead time demand value sums, and a mechanism for statistically analyzing the distribution to generate summary statistics.

The invention further includes means for determining if a next lead time demand value to be calculated is zero or nonzero, means for randomly assigning one of the nonzero historical demand values to each next nonzero lead time demand value, and means for jittering each next nonzero lead time demand value.

The invention further comprises a subseries method and system for generating a lead time demand distribution, comprising, (1) generating subseries sums based upon the historical data, and (2) using the subseries sums as a basis for the forecasted lead time demand distribution.

The invention also comprises an inventory control system that can receive the lead time demand distribution in a discrete integer format and generate (1) reorder information and (2) performance information. The inventory control system can also generate a "warning" that informs the user of the likely efficacy of the generated information.

The foregoing and other objects, features and advantages of the invention will be more apparent in the following and more particular description of the preferred embodiments of the invention as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 6 depicts a table containing summary statistics for experimental demand data; and FIG. 7 depicts a table showing an analysis of forecasting accuracy utilizing chi-square values.

FIG. 8 depicts a table showing an analysis of forecasting accuracy utilizing mean log likelihood ratios.

DETAILED DESCRIPTION OF THE INVENTION

I. Overview

Figure 1:
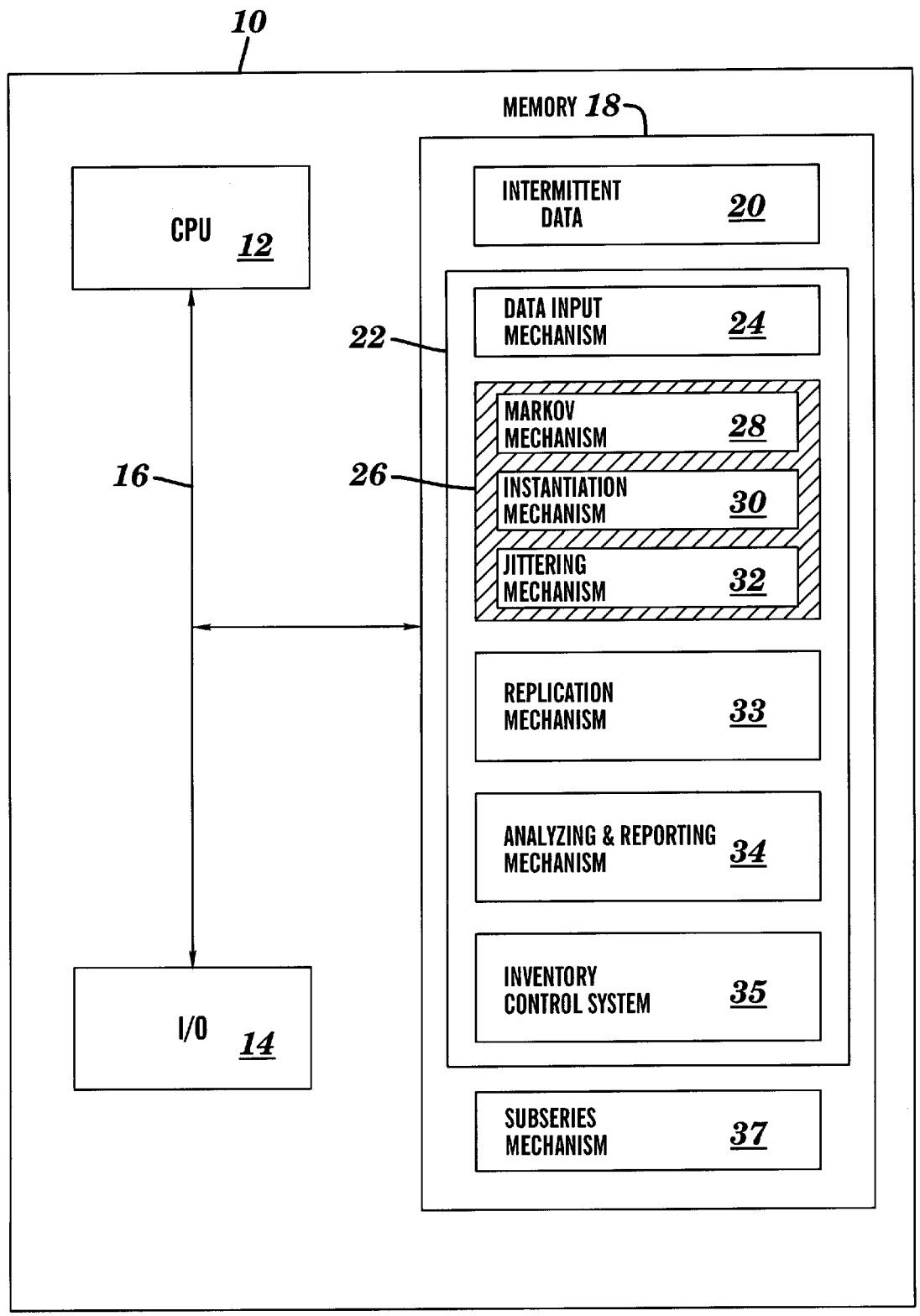
FIG. 1 depicts a high level system overview of a computer system containing a forecasting program in accordance with a preferred embodiment of the present invention.

The present invention seeks to forecast intermittent demand by utilizing various "sample reuse" methods for simulating the distribution of demand over a fixed lead time. Within the sample reuse umbrella, two categories (bootstrapping and subseries) with specific examples are described herein as the preferred embodiments. Nonetheless, it understood that variations of these described methods fall within the scope of this invention.

As previously noted, intermittent demand is generally defined as random demand with a large proportion of zero values. In addition, demand that is intermittent is also often "lumpy," meaning that there is a great variability among the non-zero values. Examples with these characteristics include demand for spare parts and high priced capital goods such as heavy machinery, jet engine tools and air craft.

In any inventory management problem, one of the critical goals is to balance the need to have stock on hand to satisfy random demand against the cost of maintaining that stock. Efficient management of this tradeoff requires accurate forecasts of the distribution of the total demand that will arise over a lead time needed for stock replenishment. Unfortunately, the intermittent nature of demand for spare parts or high priced capital goods makes forecasting especially difficult. Since demand alternates sporadically between zero and nonzero values, traditional forecasting methods are typically rendered ineffective.

The present invention includes an inventory management system that utilizes the theory of economic order quantities under a continuous review model. The continuous review model determines two quantities for each item, a reorder point and an order quantity. When on-hand inventory reaches the reorder point, one orders an amount equal to the order quantity to replenish stock. Calculating the reorder point requires forecasts of the entire distribution of demand over the lead time, defined as the time between the generation of a replenishment order and its arrival in inventory. Calculating the order quantity normally requires forecasts only of the average demand per period.

Alternatively, the inventory management system can use a periodic review model, which determines a review interval and and an "order-up-to level." Under this model, the status of the on-hand inventory is checked only at fixed intervals called "review periods," e.g., every 3 months. There will almost always be some reduction in on-hand inventory during a review period. When this occurs, the user would place a replenishment order large enough to return the total inventory (on-hand plus on-order) to a specified order-up-to level.

In addition to providing the above re-order information for continuous and periodic review models, the present invention also provides performance measures. Performance measures depend not only on the demand forecasts, but also on economic, operational and service level factors or values supplied. The economic factors include costs for holding and ordering inventory. The operational factors specify what happens when demand exceeds on-hand inventory, i.e., lost orders or back orders. The service level factors include a choice of service level criterion and the minimum acceptable value for that criterion. For example, it may be desirable to find the least-cost parameters that will ensure that 95% of all units demanded can be supplied immediately out of on-hand inventory.

The first approach taken for forecasting intermittent demand in accordance with this invention involves the use of bootstrap methods. A bootstrap can be defined as a method of computational inference based on creating simulated replicates by re-sampling the historical data. In other words, bootstrapping creates a plurality of sets of predicted future values, wherein each set of predicted future values is based on the sampling of historical data. The plurality of sets (or their sums) create a distribution that can thereafter be statistically analyzed or inputted into an inventory control system. The advantage of utilizing bootstrapping methodologies for forecasting intermittent data is that it not only reproduces standard results in standard situations, but it also applies to situations that lack analytical formulas or that violate the assumptions on which available formulas are based.

Bootstrapping, as alluded to above, creates a plurality of sets of predicted future demand values as a function of the historical demand data. For example, assume a collection of historical demand data exists for months 1–12 as shown below in Table 1. The goal is to forecast the lead time demand (LTD) requirements over a predetermined lead time, e.g., months 13–16.

approach is straightforward. In order to predict what kinds of total demand can arise over a lead time of a predetermined period (e.g., 3), the overlapping subseries sums are examined. For example, the sums of all sets of three consecutive values recorded in the demand history would be utilized as forecast values. For instance, the sum of observations 1–3, the sum of observations 2–4, etc. would be computed. The results of each sum provide the basis of a distribution of possible lead time demand values.

II. Detailed Description—The Smart Bootstrap™

One of the preferred embodiments of the invention utilizes a variant of the traditional bootstrap method in order to simulate the distribution of demand over a fixed lead time. Traditional bootstrapping samples randomly from the historical time series. This preferred embodiment, referred to as the Smart Bootstrap, provides two improvements over traditional bootstrapping. First, the method incorporates a Markov modeling technique to better predict if the next value is going to be zero or non-zero. This improves performance because it is recognized that nonzero demand often comes in bunches or runs (i.e., it is positively autocorrelated). Likewise, it is also possible, although less likely, for demand to almost never have two or more consecutive nonzero values (i.e., to be negatively autocorrelated). Second, the method incorporates a novel jittering technique. Jittering is a process in which selected historical values are randomly changed to "neighboring" values in order to enlarge the set of possible forecast values. A neighborhood, or set of neighboring values can be defined as a range of values centered around a historical value. This process likewise improves performance since it is recognized that the set of possible future values is larger than the

TABLE 1

| MONTH:  | 1 | 2 | 3 | 4 | 5 | 6 | 7 | 8 | 9 | 10 | 11 | 12 | 13 | 14 | 15 | 16 |
|---------|---|---|---|---|---|---|---|---|---|----|----|----|----|----|----|----|
| DEMAND: | 0 | 0 | 0 | 4 | 0 | 0 | 1 | 0 | 1 | 0  | 2  | 0  | ?  | ?  | ?  | ?  |

Of particular interest is forecasting a distribution of possible LTD values for a given lead time. In a traditional bootstrap methodology, random samples are taken from the historical data and assigned to months 13–16 to form a series of lead time demand values. This is then repeated or replicated N times to yield N series, each having a cumulative lead time demand value or LTD sum indicated in Table 2 as LTD(n). Table 2 provides an LTD distribution with five replications, i.e., N=5.

TABLE 2

| n | Series  | LTD(n) |
|---|---------|--------|
| 1 | 0 0 1 2 | 3      |
| 2 | 0 0 0 0 | 0      |
| 3 | 0 1 0 0 | 1      |
| 4 | 2 4 0 4 | 10     |
| 5 | 0 0 2 0 | 2      |

In a typical real world application, the number of replications N would be a much higher number, for example N=1000. A distribution of the N demand values can then be analyzed to generate statistical information and/or be fed into an inventory control program. Other variations of bootstrapping can likewise be implemented.

In addition to bootstrapping, the present invention discloses a second technique for forecasting intermittent data, referred to as the subseries method. The basis of this particular set of values observed in the history. For example, if the history only records values of 0, 1, and 3, the forecasted values should include other values, such as 2's, 4's, 5's, etc.

Referring now to FIG. 1, a computer system 10 is shown depicting a forecasting program 22 residing in memory system 18. The computer system comprises a CPU 12, and input/output (I/O) 14, and a bus 16. It is recognized that computer system 10 could comprise additional and related components, and that each of the computer system components could reside in a single computer system or a distributed network, such as a local area network (LAN) the world wide web. Furthermore, the invention could be implemented with multiple CPU's in a parallel processing system, or by special purpose hardware. As can be seen, memory system 18 comprises intermittent data 20 and forecasting program 22. Intermittent data 20, as described above, is generally characterized as a set of time series data values containing frequent zero values intermixed with random nonzero values. Although the preferred embodiment is primarily concerned with intermittent data 20, it is understood that other types of data sets could likewise be used by the software program described herein. Forecasting program 22 is shown to comprise a data input mechanism 24, a lead time value generator 26, a replication mechanism 33, and an analyzing and reporting mechanism 34. The data input mechanism 24 is primarily used to input intermittent data 20. Intermittent data 20 will generally be a collection of the user's historical demand data over a period of time for one or more parts or items. Lead time value generator 26 is primarily used to generate a series of forecasted lead time demand values (i.e., an "LTD series") based on the intermittent data. Replication mechanism 33 is essentially a looping mechanism used to generate "replicates" of LTD data, i.e., a plurality of LTD series. Analyzing and reporting mechanism 34 provides tabular and graphical data based on the generated LTD data, and provides lead time demand calculations based upon a statistical analysis of the LTD data.

The lead time value generator 26 calculates each lead time value for a LTD series utilizing a Markov mechanism 28, an instantiation mechanism 30, and a jittering mechanism 32. Once a LTD series is generated, the values can be summed to generate an LTD sum. The process is generally then repeated N times to generate N LTD sums. The actual number of replications N can be user defined or defined by some other constraint. Once the N LTD sums are collected, the analyzing and reporting mechanism 34 is used to provide statistical results that can be examined by the user, or fed into a subsequent process, such as an inventory control system 35. The particular methods used by the forecasting program 22 will be described in more detail below.

It is understood that the forecasting program 22 can be implemented using some or all of its components and/or sub-components 28, 30, 32, without departing from the scope of the invention. For example, LTD forecasting could still be achieved pursuant to this invention without one or more of the Markov mechanism 28, the instantiation mechanism 30, or the jittering mechanism 32. Moreover, it is understood that forecasting program 22 can reside in any computer readable format suitable for storing computer instructions, including magnetic media, optical media, random access memory, read only memory, transmission media, etc.

Figure 2:
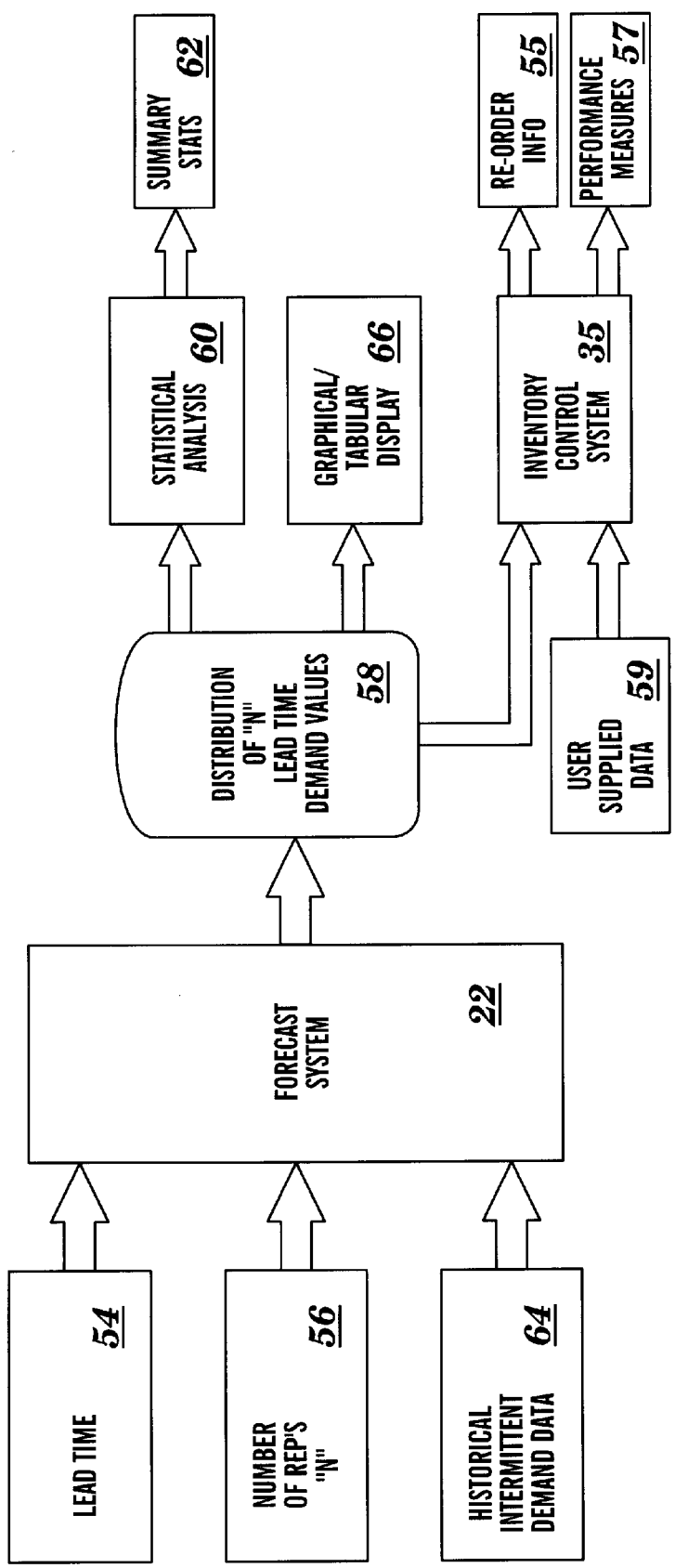
FIG. 2 depicts a flow diagram of the software product in accordance with a preferred embodiment of the present invention.

Referring now to FIG. 2, an overview of the flow of the forecasting program 22 is depicted. Specifically, the forecast program 22 comprises three inputs; a lead time 54, a number N for specifying the number of replications 56, and the historical intermittent demand data 64. The forecast program outputs a distribution 58 of N LTD sums, which are either presented in a graphical or tabular display 66, or statistically analyzed 60 to provide summary statistics 62. The statistical analysis may examine a mean, median, standard deviation, minimum, fixed percentile (e.g., 99th), and/or a maximum. Alternatively, the user could preselect demand levels of interest and then show the estimated probability of exceeding those levels.

It is understood that although the preferred embodiments describe inputting a lead time 54 that is fixed, the term lead time 54 may also encompass a random lead time. Specifically, the random lead time could comprise a distribution of possible lead times. In this case, each replicate (or series of lead time data) would be of varying size, depending upon a random selection from the inputted distribution of lead times.

Also shown in FIG. 2 is an inventory control system 35 that receives the distribution of lead time demand values 58 along with user supplied data 59. The user supplied data 59 may include holding, ordering, and shortage costs for inventory items. The data 59 may also include service level percentages that the user would like to meet. These may include percentage of units supplied from inventory, percentage chance of no stock out during lead time, and percentage chance of replenishment shortfalls.

The output of the inventory control system generally comprises reorder information 55 and performance measures 57. The reorder information 55 may include an economic order quantity (EOQ) and reorder point for a continuous review model and a review interval and order up-to level for a periodic review model. The performance measures 57 provide percentages for the above mentioned service levels.

Figure 3:
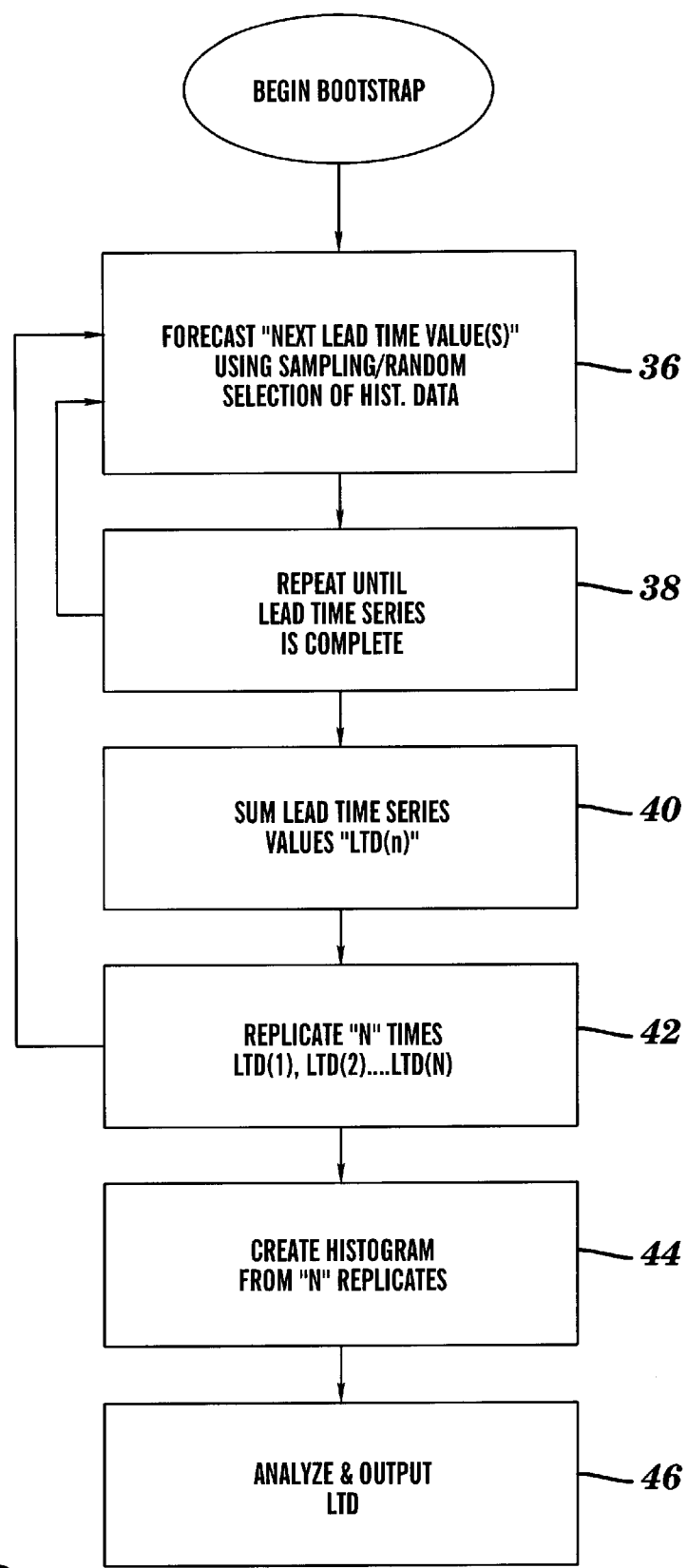
FIG. 3 depicts a high level flow diagram of a method of forecasting in accordance with a preferred embodiment of the present invention.

Referring now to FIG. 3, a flow chart for implementing any bootstrap methodology in accordance with this invention is depicted. As described above, the goal is to generate a distribution of LTD series and/or sums based upon historical demand data. The first step 36 is to choose "a next LTD value(s)" as a function of some sampling and/or random selection from the historical data. Thus, assuming that the historical data is made up of 12 data values, such as that shown in Table 3,

TABLE 3

| MONTHS: | 1 | 2 | 3 | 4 | 5 | 6 | 7 | 8 | 9 | 10 | 11 | 12 |
|---|---|---|---|---|---|---|---|---|---|---|---|---|
| | 0 | 0 | 0 | 4 | 0 | 0 | 1 | 0 | 1 | 0 | 2 | 0 | a sampling and/or random selection of some or all of the historical values is utilized as part of the algorithm for determining each next LTD value(s). The exact method and type of sampling/random selection used will depend on the specific bootstrap methodology implemented. In a traditional bootstrap methodology, the next lead time value will be a straight forward random selection from the data set. In the Smart Bootstrap, the selection will be made in accordance with the methodology described below with regard to FIG. 4. Other bootstrap variants, such as the moving block bootstrap, the stationary bootstrap, and the threshold bootstrap provide alternative methods for choosing next LTD values. Details of these variations can be found in the following references, which are herein incorporated by reference. Efron, B., and Tibshirani, R. J., An Introduction to the Bootstrap, Chapman and Hall, New York, 1993; Künsch, H., "The Jackknife And The Bootstrap For General Stationary Observations," Annals of Statistics 17 (1989), 1217–1241; Politis, D. N. and Romano, J. P., "The Stationary Bootstrap," Journal of the American Statistical Association 89 (1994), 1303–1313; Park, D. and Willemain, T. R.: "The Threshold Bootstrap and Threshold Jackknife," Technical Report 37-97-461, Department of Decision Sciences and Engineering Systems, Rensselaer Polytechnic Institute, Troy, N.Y., 1997.

Next, the forecasting process 36 is repeated until an LTD series is complete 38. The size of the LTD series is equal to the number of months or other time units that make up the lead time, and will generally be user defined or could be random, as explained above. For example, if a user wanted to know how many widgets would be required over the next four time periods, e.g., months, the LTD series size would equal four. Once the LTD series is complete, the lead time values making up this series are summed 40 to generate a first lead time demand sum, e.g., LTD(1). Next 42, the entire process is replicated N times to create N LTD sums, LTD(1), LTD(2) . . . LTD(N). Once the N LTD sums are created, a histogram and/or other type of distribution can be stored and/or displayed 44. The distribution can then be analyzed 46 to generate summary statistics, or be used as input to an inventory control system 35.

Figure 4:
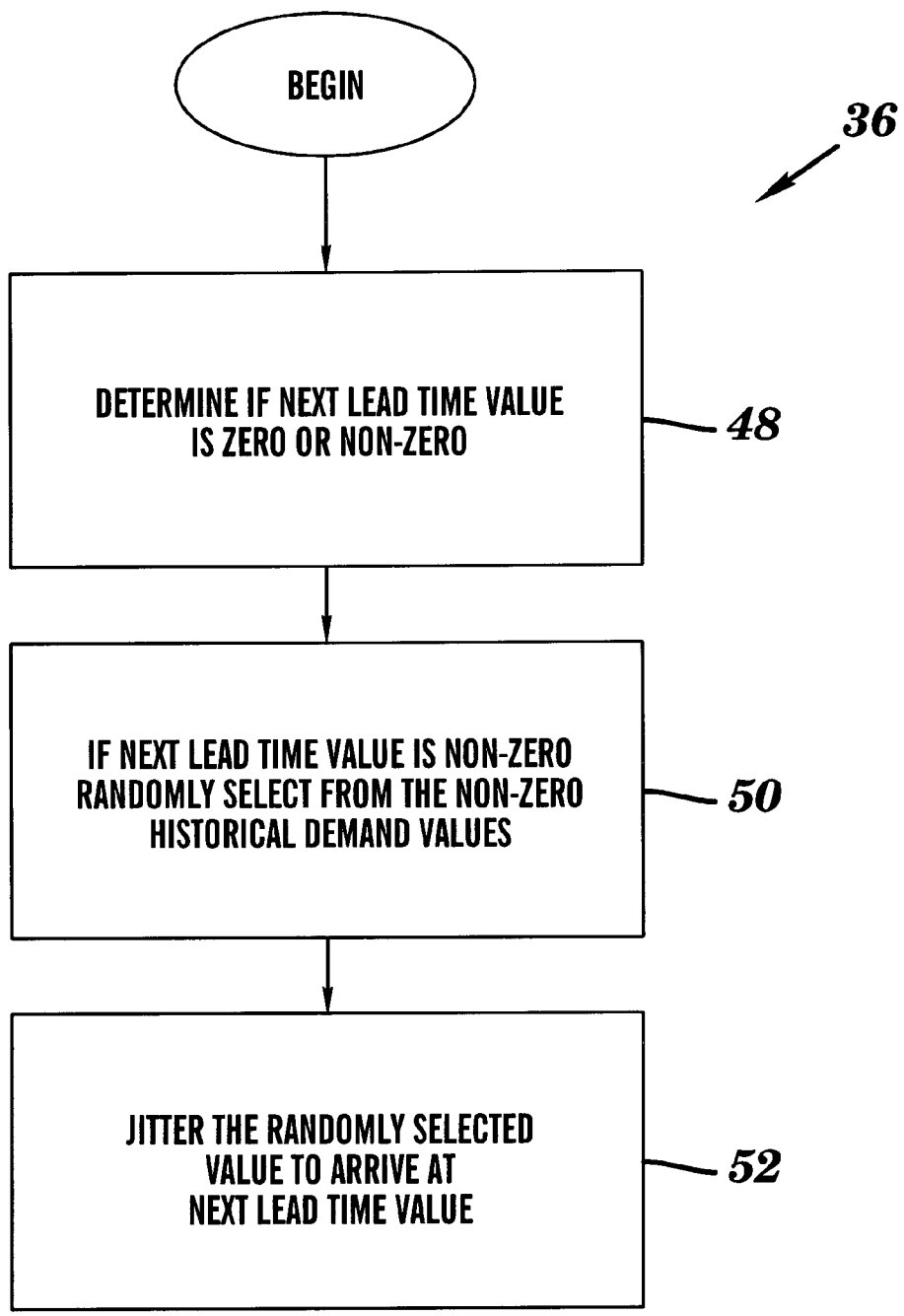
FIG. 4 depicts a flow diagram for selecting next demand values in accordance with a preferred embodiment of the present invention.

Referring now to FIG. 4, the step 36 of forecasting a next LTD value in accordance with the Smart Bootstrap is described. The forecasting method has three stages:

1. (1a) Estimation of a two-state Markov model of demand values, with states "zero" and "nonzero," and (1b) Prediction of the occurrence of zero and nonzero values over the lead time;
2. Instantiation of nonzero values with randomly selected nonzero values from the history; and
3. Jittering of the nonzero values.

The methodology is explained using the following notation:

X(t)=demand value at time t
X*=a randomly selected nonzero value of demand
T=number of historical demand values
L=fixed lead time or forecast horizon
N=a nonzero demand, for whatever value
S=a jittered value of historical demand
Poo=Prob[next demand is zero, given last demand was zero]
Pon=Prob [next demand is nonzero, given last demand was zero]
Pno=Prob [next demand is zero, give last demand was nonzero]
Pnn=Prob [next demand is nonzero, given last demand was nonzero]
U=random number uniformly distributed between 0 and 1
Z=random number with a standard normal (i.e., Gaussian) distribution (mean=0, variance=1).

The first step 48 is to determine if the next LTD value is zero or nonzero. The preferred methodology for performing this step is to utilize a Markov model as explained below.

1a. Estimation of Markov model

A Markov model allows the chance that the next demand value will be nonzero to depend on whether the last demand was zero or nonzero. Commonly, nonzero demands often come in spurts, so the probability of a nonzero demand is often greater just after observing a nonzero demand than after observing a zero demand, i.e., Pnn>Pon. This effect can be important over short lead times. The Markov model has four transition probabilities, but two of them are determined once the other two are known, since $$Poo+Pon=1 \qquad (1)$$

and $$Pno+Pnn=1. \qquad (2)$$

Poo and Pnn can be estimated from the history, and the other two values, Pon, Pno, can be estimated using the relationships above.

A naive estimate of Poo is given by $$Poo=\{\# \text{ of 0 to 0 transitions}\}/\{\# \text{ of 0 to 0 and } \# \text{ of 0 to } N \text{ transitions}\}. \qquad (3)$$

However, if either all or none of the transitions are 0 to 0, this would give Poo=1 or 0, respectively. These estimates would be wrong, since a transition from 0 to 0 would be neither a certain nor an impossible event. Accordingly, the preferred method uses "started counts" in the estimates, such as:

$$Poo=[\tfrac{1}{6}+\{\# \text{ of 0 to 0 transitions}\}]/[\tfrac{1}{3}+\{\# \text{ of 0 to 0}+\# \text{ of 0 to } N \text{ transitions}\}] \qquad (4)$$

$$Pnn=[\tfrac{1}{6}+\{\#\text{of } N \text{ to } N \text{ transitions}\}]/[\tfrac{1}{3}+\{\# \text{ of } N \text{ to 0}+\# \text{ of } N \text{ to } N \text{ transitions}\}]. \qquad (5)$$

1b. Prediction of zero and nonzero values

Once estimates of the Markov transition probabilities are made, they can be used to generate strings of zero and nonzero values over the lead time. Temporarily, the value 1 may be used to stand for any nonzero value. For each time period t from T+1 to T+L, the logic is as follows:

$$\text{IF } X(t-1)=0 \qquad (6)$$

THEN (generate a transition from state 0)

IF U<Poo THEN X(t)=0 ELSE X(t)=1

ELSE (generate a transition from state N)

IF U<Pnn THEN X(t)=1 ELSE X(t)=0

This generates strings that look as shown below in Table 4. This example is based on historical data that ended with a zero value ("Final State=0"). The forecasts are made for 12 periods into the future (i.e., a lead time of 12), and four replications (Rep. 1–4) of the bootstrap are shown. Each replication comprises a string of zero/non-zero data.

TABLE 4

Final State = 0

Zero vs Non-Zero State Values:

| Lead Time: | 1 | 2 | 3 | 4 | 5 | 6 | 7 | 8 | 9 | 10 | 11 | 12 |
|---|---|---|---|---|---|---|---|---|---|---|---|---|
| Rep#: 1 | 1 | 1 | 1 | 1 | 0 | 0 | 1 | 0 | 0 | 1 | 0 | 0 |
| 2 | 0 | 0 | 1 | 1 | 1 | 1 | 0 | 0 | 0 | 0 | 0 | 1 |
| 3 | 0 | 0 | 0 | 1 | 0 | 1 | 0 | 0 | 0 | 1 | 1 | 0 |
| 4 | 0 | 1 | 0 | 1 | 1 | 0 | 0 | 0 | 0 | 0 | 0 | 0 |

The next step 50 is to replace the 1's with appropriate values from the history as described below.

2. Instantiation of nonzero values

Wherever the string of future values contains a 1, it is substituted with one of the historical nonzero values, selected at random. For example, if the nonzero values in the history were {1, 2, 1, 11, 7, 1, 1, 1}, each of those eight values would have a ⅛ chance of being selected. Note that the five instances of a demand of 1 are treated as five separate values. This process is bootstrapping, and these bootstrap values are referred to as X*. The result of this step is a set of forecast values that looks realistic as shown in Table 5. For example, in the first replication, the forecast for 2 periods ahead becomes 7 and the forecast for seven periods ahead becomes 2.

TABLE 5

| | 1 | 2 | 3 | 4 | 5 | 6 | 7 | 8 | 9 | 10 | 11 | 12 |
|---|---|---|---|---|---|---|---|---|---|---|---|---|
| Raw Demand Values: | 1 | 7 | 1 | 1 | 0 | 0 | 2 | 0 | 0 | 1 | 0 | 0 |
| | 0 | 0 | 11 | 1 | 2 | 1 | 0 | 0 | 0 | 0 | 0 | 0 |
| | 0 | 0 | 0 | 1 | 0 | 1 | 0 | 0 | 0 | 1 | 11 | 0 |
| | 0 | 7 | 0 | 1 | 2 | 0 | 0 | 0 | 0 | 7 | 0 | 0 |

Next, the nonzero lead time values are jittered 52 in accordance with the following procedure.

3. Jittering the nonzero values

Often, the historical data will only contain a few distinct nonzero values. However, one could expect different values to appear in the future, so jittering is used to generate some other integers beyond the set in the history. This is done in such a way that there is more variation around larger numbers than smaller. Thus, if the historical value selected in the previous stage is a 2, the jittering process might substitute a "neighboring value," such as a 1, a 3 or maybe even a 4 in place of the 2. In contrast, if the historical value is a 25, the range of neighboring values is chosen to be much greater, so that the jittering process might substitute a 36 or an 18 for the 25. The jittering process smears out the distribution of nonzero demands from a few observed values to a set of normal curves centered on the observed values. The jittering process introduces a slight upward bias into the forecasts. However, experiments revealed that jittering generally improves accuracy, especially for short lead times, for which there is less variety in the distribution of bootstrap results.

The jittering process may be implemented as follows:

$$S=1+INT\{X^*+Z\sqrt{X^*}\} \quad (7)$$

$$\text{IF } S \leq 0, \text{ THEN } S=X^*. \quad (8)$$

Equation (7) creates a new integer value S (i.e., a "neighboring value") centered on the historical value X*. Equation (8) aborts the jittering process if it creates a demand that is non-positive. An alternative way to handle the bad luck of a non-positive S would be to repeat the random sampling process in equation (7) until $S \geq 0$. However, equation (8) seems to work well and will be faster.

Now the final results include some values not seen in the history. For instance, the value of 7 in the second period of the first replication in Table 5 becomes a 10 in Table 6.

TABLE 6

| Jittered Demand Values (positive or zero): | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 3 | 10 | 1 | 1 | 0 | 0 | 4 | 0 | 0 | 1 | 0 | 0 |
| 0 | 0 | 15 | 3 | 2 | 1 | 0 | 0 | 0 | 0 | 0 | 0 |
| 0 | 0 | 0 | 2 | 0 | 1 | 0 | 0 | 0 | 2 | 8 | 0 |
| 0 | 6 | 0 | 1 | 1 | 0 | 0 | 0 | 0 | 7 | 0 | 0 |

While, this embodiment describes a preferred method for jittering, other similar methods could be used and therefore fall within the scope of this invention.

III. Subseries Method

An additional set of embodiments for providing an LTD distribution according to this invention involves the use of subseries concepts. Here the notion is to simply approximate the distribution of cumulative lead time demand by the distribution of sums of overlapping subseries in the demand history that are as long as the lead time. Three possible approaches are considered, one nonparametric and two parametric. The simple nonparametric version of this approach does not provide a probability for every possible integer value. The parametric versions provide a complete set of probabilities by utilizing discretized normal or lognormal distributions to fit the observed nonzero sums. The resulting forecasts have been found to be more accurate than those of exponential smoothing and Croston's method. In addition, because of the relative simplicity, subseries forecasts can be computed faster than the Smart Bootstrap forecast.

Figure 5:
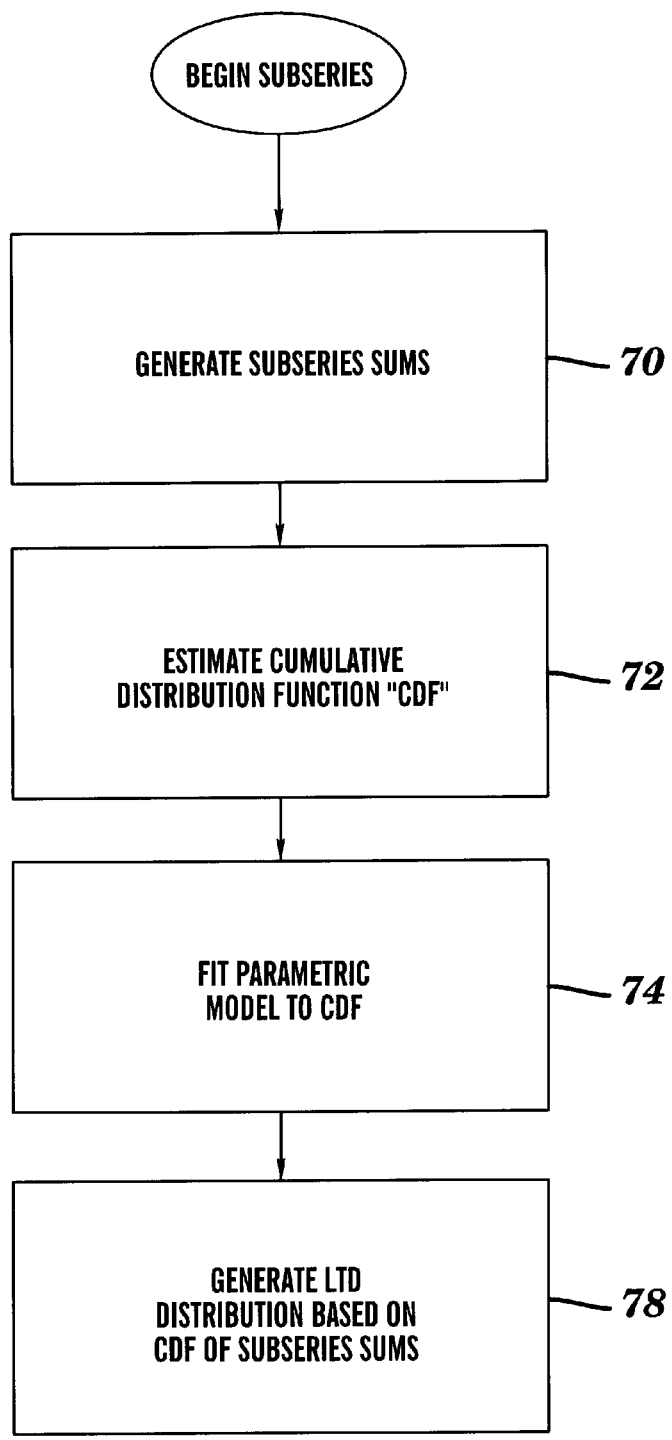
FIG. 5 depicts a high level flow diagram of a method of forecasting using a subseries method in accordance with a preferred embodiment of the present invention.

Referring now to FIG. 5, the first step 70 of any subseries implementation is to calculate the overlapping subseries sums. Consider an example with a lead time L=3 and a demand history consisting of T=28 monthly values. Subseries 1 consists of observations 1–3, subseries 2 overlaps subseries 1 and consists of observations 2–4, and so forth. Summing the values in each of the overlapping subseries gives the T–L+1=26 subseries sums.

The second step 72 is to estimate a cumulative distribution function (CDF) to provide a particular distribution model. Next 74, a parametric model can be fit to the CDF. Finally 76, the CDF of the subseries sums can be utilized to generate the LTD distribution. For example, suppose the 26 sums take 9 distinct values: 0 (fourteen times), 1, 2, 5 (twice), 6 (three times), 7, 10 (twice), 12, and 54. There are 12 nonzero values. F(X), the cumulative distribution function (CDF) of LTD, can be estimated as either a parametric or non parametric model. For the nonparametric model, the following empirical distribution function can be used:

$$F^\wedge(0)=(\tfrac{1}{2}+\#\{=0\})/(1+\# \text{ total})$$

$$F^\wedge(X)=F^\wedge(0)+[1-F^\wedge(0)] \cdot [(\tfrac{1}{2}+\#\{\leq X \text{ and } >0\})/(1+\#\{>0\})], X>0.$$

So, for the above example, $$F^\wedge(0)=(\tfrac{1}{2}+14)/(1+26)=0.537$$

$$F^\wedge(1)=0.537+(1-0.537) \cdot (\tfrac{1}{2}+1)/(1+12)=0.590$$

$$F^\wedge(2)=0.537+(1-0.537) \cdot (\tfrac{1}{2}+2)/(1+12)=0.626$$

$$F^\wedge(5)=0.537+(1-0.537) \cdot (\tfrac{1}{2}+4)/(1+12)=0.697$$

and so forth for $F^\wedge(6)$, $F^\wedge(7)$, $F^\wedge(10)$, and $F^\wedge(12)$ up to $$F^\wedge(54)=0.537+(1-0.537) \cdot (\tfrac{1}{2}+12)/(1+12)=0.982.$$

Note that the nonparametric subseries model has increments in its estimate of the CDF only at those values of LTD that appeared in the subseries sums.

To provide a more complete distribution, a parametric model can be utilized. This involves the use of a "mixture model," so named because the model is a mixture of two components. One component is the probability of a zero result. The other is a parametric model for the nonzero values. (A "parametric" model has an explicit expression, or formula, for the probability distribution. That expression will have parameters in it that must be adjusted to fit the data at hand.) The mixture model is:

$$F^\wedge(X)=F^\wedge(0)+[1-F^\wedge(0)]^*G^\wedge(X), X>0$$

where $F^\wedge(0)=(\tfrac{1}{2}+\#\{=0\})/(1+\#\text{total})$.

$G^\wedge(X)$ is the estimated, discretized CDF of either a normal or lognormal distribution. The parametric subseries models are continuous, so they can be discretize in any number of ways, e.g., $G^\wedge(1)$ includes all the area under the normal or lognormal density function to the left of 1. In contrast to the nonparametric estimate $F^\wedge(X)$, the parametric estimates $G^\wedge(X)$ have probability increments at every possible value of LTD. The parameters of the normal and lognormal models are estimated by matching the sample mean and sample variance calculated from those subseries sums with nonzero values. A normal probability density function is calculated as follows:

$$g(X)=\{1/(Sqrt[2^*Pi]^*Sigma)\}^*exp(-0.5^*[(X-Mu)/Sigma]^\wedge 2)$$

for: $-\infty<X<\infty$, where Mu and Sigma are the estimated parameters representing the mean and standard deviation, respectively.

A lognormal probability density function is provided as follows:

$$g(X)=\{1/(Sqrt[2^*Pi]^*Sigma^*X)\}^*exp(-0.5^*[(Ln(X)-Mu)/Sigma]^\wedge 2)$$

for $0<=X<\infty$.

For the lognormal case, the mean is $exp[Mu+0.5^*Sigma^\wedge 2]$ and the standard deviation is $Sqrt\{exp(2^*Mu+Sigma^\wedge 2)^* [exp(Sigma^\wedge 2)-1]\}$.

Note that these formulas give g(X) not G(X). G(X) is the cumulative distribution function, obtained by integrating the probability density function from -infinity to X. That is, $$G(X) = Integral[g(u), u=-\infty \ldots X].$$

G^(X) is an approximation of G(X), given that the parameters Mu and Sigma are estimated from from the data. For the lognormal, the mean and standard deviation are both functions of Mu and Sigma. Standard statistical methods, e.g., the method of moments estimation, can be used to solve two simultaneous nonlinear equations in the two unknowns Mu and Sigma to match the observed sample mean and sample standard deviation.

IV. Forecast Accuracy Assessed Using Industrial Data

In order to test the embodiments described above, over 28,000 data series of actual intermittent data were studied. The data is summarized in the table shown in FIG. 6.

A. Measures Of Forecast Accuracy

Assessing the performance of forecasting methods for intermittent demand required the development of new measures. When assessing forecasts of smooth demand, it is conventional to use such accuracy measures as the mean squared error (MSE) or the mean absolute percentage error (MAPE). This latter is generally preferred when one wants to assess the performance of alternative forecasting methods over many items, because its relative, scale-free measure can be averaged naturally across series with different mean levels. However, when one or more of the observed demands is zero, as is often true with intermittent demand, one cannot compute the MAPE. This is one problem with assessing accuracy.

The other problem is the need to assess the quality not of a point forecast but of a predicted distribution. This is because inventory control models require as input not a point forecast but a forecast of the entire distribution of LTD. Given historical data on item demand, one can hold out the final L periods, sum their demands, and thereby create a point estimate of actual LTD. The problem is how to use this single holdout value to assess the quality of an entire predicted distribution of LTD for that item. It was found that industrial data sets are generally "short and wide," e.g., there were only a few dozen monthly observations on each of hundreds or thousands of inventory items. This means that one can afford to create only one holdout value of LTD for each item, making it impossible to compare two forecast distributions on an item-specific basis. However, there are data for many items, so some form of pooling across items has potential as a way to assess the quality of forecast distributions. To respond on these two problems, two new ways to assess the forecast distributions were devised.

A(1). Accuracy test based on uniform distribution of percentiles

The first method is based on observed percentiles of the forecast LTD distribution. To understand this approach, first consider the easier problem of assessing the predicted distribution of a continuous random variable. Among the methods used to solve such problems are the chi-square test and tests based on the probability-integral transformation; the present solution uses both.

The probability-integral transformation converts an observed value of a random variable X into its corresponding fractile using the CDF, F(X). For example, if the median value is 2.35, then the transformation converts 2.35 into 0.5. If F(X) is known exactly, the transformation converts the observed values of the random variable into values that have a uniform distribution. In the more realistic case of having to use an estimate F^(X), sampling variability leads to departures from uniformity. Nevertheless, one can take the degree of conformance of the estimated fractiles to the uniform ideal as a basis for assessing the relative quality of the estimated CDF.

However, the present invention does not necessarily deal with a continuous random variable, since LTD is discrete. Because the CDF is defined only at integer values in this case, only a discrete set of fractiles are observed. To convert this problem back into one in which departures from uniformity can be assessed, the possible fractiles are first divided into 20 equal bins of width 0.05. When a LTD count of X is observed, F^(X)–F^(X–1) is calculated and that probability is distributed proportionally over the relevant bins. Then we compare the distribution of counts in the 20 bins to a uniform distribution, summarizing the departure from uniformity using the chi-square statistic. The choice of 20 bins is an appropriate compromise between resolution and statistical stability, given the large numbers of items in our industrial data sets. Other numbers of bins would be appropriate if there were more or fewer items available.

To illustrate this method of fractional allocation of counts, consider a distribution of LTD that is estimated to be Poisson with mean 1.3. In this case, F^(0)=0.273 and F^(1)=0.627. Now suppose that the observed LTD is 1. The present method distributes F^(1)–F^(0)=0.354 uniformly over the range from 0.273 to 0.627. Thus we credit 0.076=(0.30–0.273)/0.354 of a count to the bin spanning 0.25 to 0.30, 0.141=0.05/0.354 of a count to each of the six bins spanning the range from 0.30 to 0.60, and 0.076=(0.627–0.60)/0.354 of a count to the bin spanning 0.60 to 0.65. These fractional counts are accumulated across items, then the uniformity of the total counts is assessed across the 20 bins using the chi-square statistic.

A(2). Accuracy test based on log likelihood ratios

The second method of assessing the forecast distribution of LTD is based on log likelihood ratios. The likelihood of an event is defined to be the probability of the occurrence of that event, as computed using a specific probability model. If there are two competing models, the ratio of the two likelihoods is a measure of relative performance. The model whose likelihood forms the denominator of the ratio is referred to as the "reference" and the other method is referred to as the "alternative." Because likelihoods are often small numbers and their ratios have very skewed distributions, it is customary to work with the logarithm of the likelihood ratio.

The reasoning behind using the log likelihood ratio is simple. If a model predicts LTD well, then an observed holdout value of LTD for an item will, on average, have a high likelihood of occurring. Conversely, if the model predicts poorly, the observed LTD value will have a low likelihood. If the mean log likelihood ratio, averaged over inventory items, is greater than zero, then the alternative is more accurate than the reference.

Because exponential smoothing is the most used statistical forecasting method for intermittent demand, is was chosen as the reference method. Four alternatives were evaluated: Croston's method, the bootstrap method, and the two parametric subseries methods.

The nature of the industrial data forced an elaboration to the definition of an event and its likelihood. The specific problem was that the data frequently included holdout values of LTD that were extremely unlikely under either the reference or the alternative or both, with one or both likelihoods being essentially zero. In such cases, the log likelihood ratio could not be computed. In turn, this made it difficult to compute summary statistics for the log likelihood ratios computed across data sets.

Our response was to divide the range of possible LTD values into random-width bins defined by the empirical distribution of subseries sums. To illustrate, consider again the example cited earlier in which the observed subseries values were: 0 (fourteen times), 1, 2, 5 (twice), 6 (three times), 7, 10 (twice), 12, and 54. In this case, likelihoods were computed for the following events: 0, 1, 2, 3–5, 6, 7, 8–10, 11–12, 13–54 and 55+.

This approach greatly reduced the frequency of difficulty in computing the log likelihood ratios, though it did not eliminate it. When there were difficulties, we used the following logic to assign values to the log likelihood ratio. If the likelihoods under both the reference and the alternative are 0, assign 0, indicating a tie. If only the likelihood under the reference is 0, assign +99. If only the likelihood under the alternative is 0, assign −99. Then, when computing sample means of log likelihood ratios, we Winsorize the data, replacing any +99 (−99) values with the next largest (smallest) value.

B. Empirical Results

B(1). Comparisons based on uniform distribution of percentiles

We compared exponential smoothing and Croston's method with the bootstrap and two parametric subseries methods on the basis of the uniformity of observed LTD percentiles. For each of the nine industrial data sets, we tested the four methods using lead times of 1, 3 and 6 months. Because the distribution of chi square values was highly skewed, it simplified the analysis to work with the logarithm of the chi square statistics. Note that a smaller value of the logarithm of the chi square statistics is preferable, since it indicates a flatter, i.e., more uniform, distribution of counts across the 20 bins.

Figure 9:
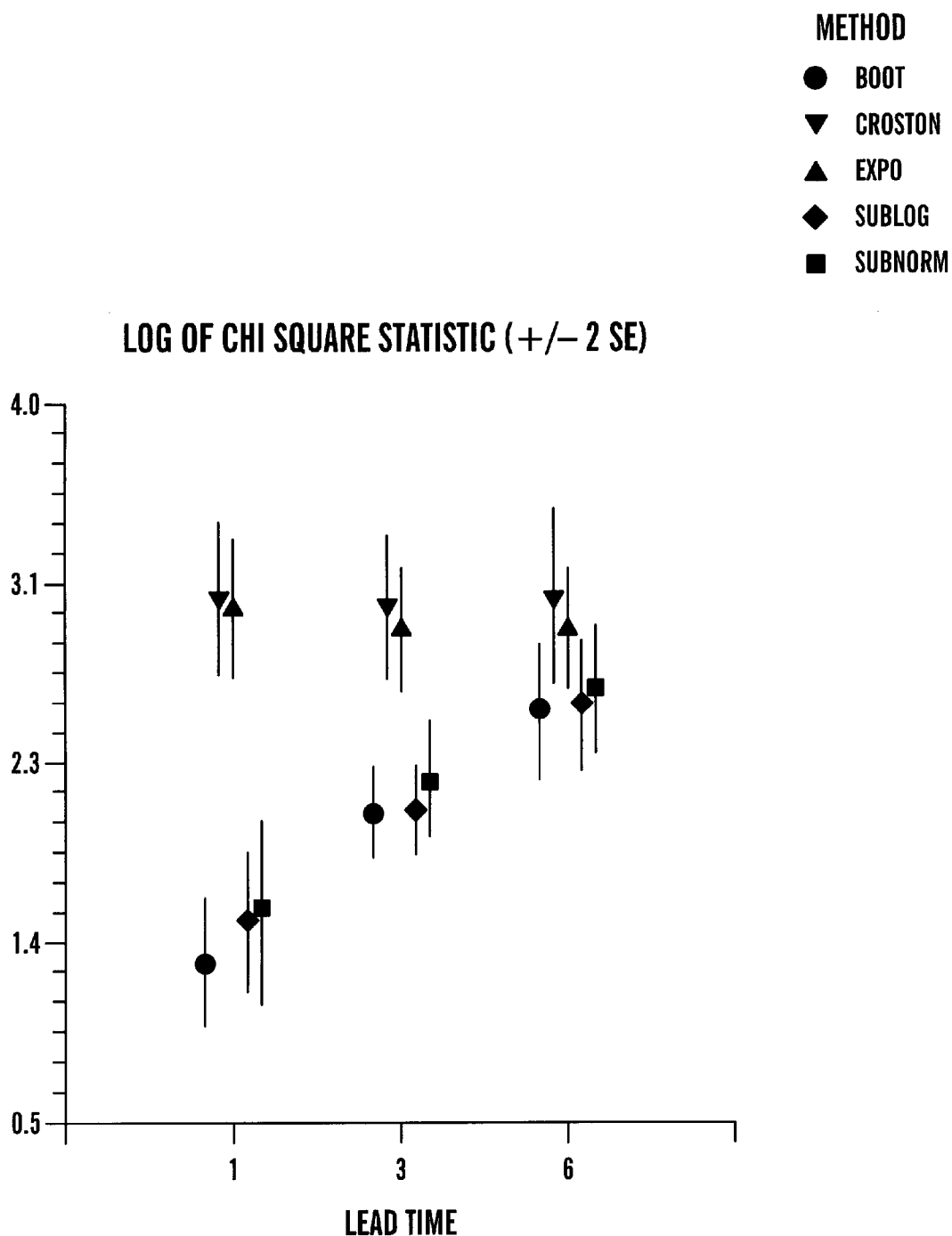
FIG. 9 depicts a graph of the forecasting accuracy utilizing chi-square values.

The table shown in FIG. 7 and the graph of FIG. 9 show how data set, lead time and forecasting method influenced the quality of the LTD forecasts. The following conclusions were drawn:

1. The bootstrap method performed best overall.
2. The subseries methods were slightly less accurate than the bootstrap, but the differences were not statistically significant. The lognormal variant of the subseries method was slightly more accurate than the normal variant.
3. Exponential smoothing and Croston's method were the least accurate methods, with Croston's method slightly less accurate than exponential smoothing.
4. The accuracy of the new methods decreased notably with the length of the lead time, although the new methods remained more accurate than exponential smoothing and Croston's method. Lead time, however, had little effect on the accuracy of the two variants of exponential smoothing.

Overall, the new forecasting methods achieved higher accuracy.

B(2). Comparisons based on log likelihood ratios

Figure 10:
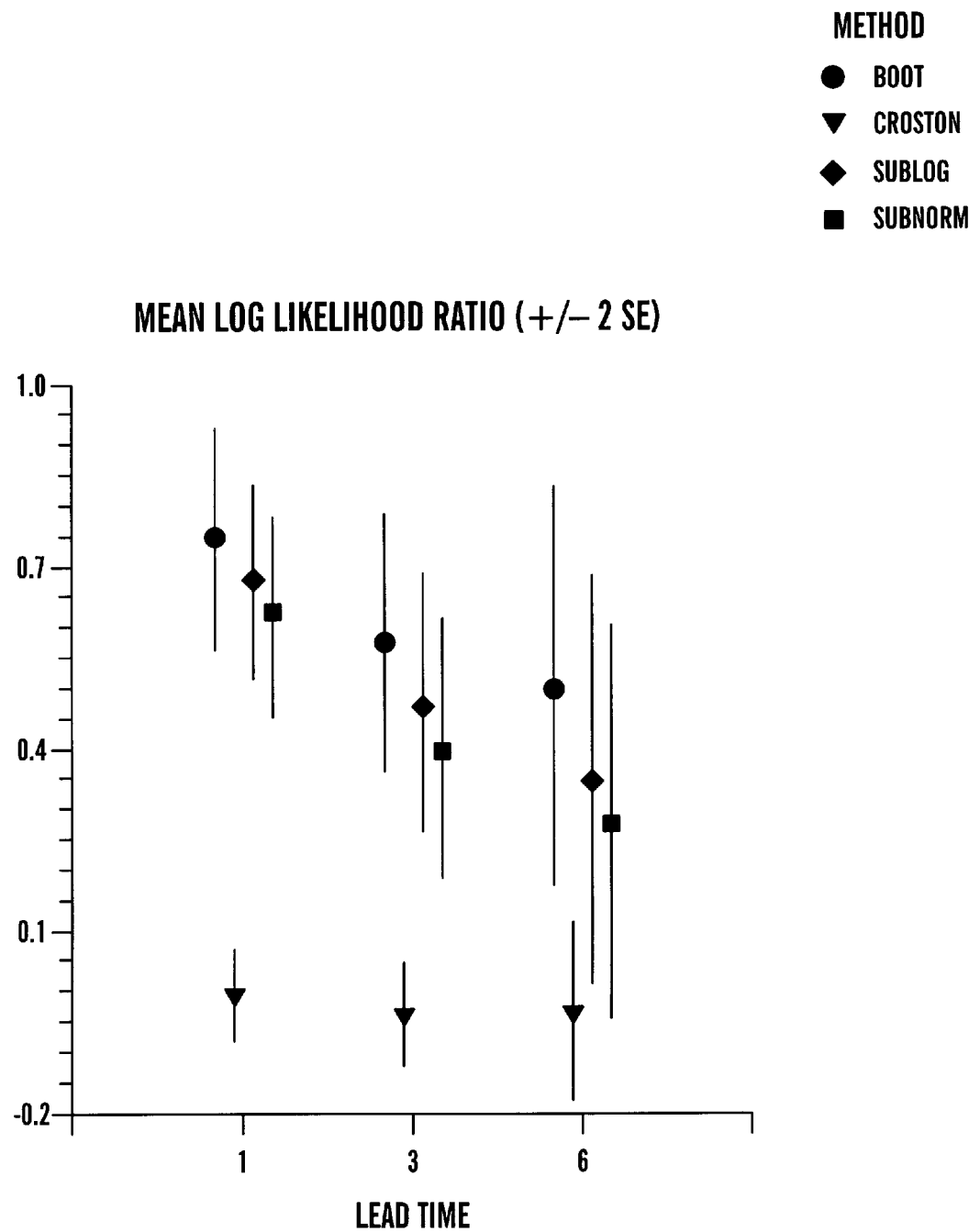
FIG. 10 depicts a graph of the forecasting accuracy utilizing mean log likelihood ratios.

The second approach to assessing the performance of the forecast distribution of LTD used the mean values of the log likelihood computed using the various forecasting methods. In this case, we compared the exponential smoothing reference against four alternatives: Croston's method, the bootstrap, and the subseries method with a fitted normal and lognormal distribution. The table shown in FIG. 8 and the graph shown in FIG. 10 show the details of the comparisons. Positive values of the mean log likelihood indicate that the alternative performed better than exponential smoothing for the particular data set and lead time. Our conclusions are essentially the same as with the previous measure of accuracy:

1. The bootstrap generally performed best.
2. The subseries methods performed better than Croston's method; the lognormal variant of the subseries method was slightly more accurate than the normal variant.
3. Croston's method generally performed worse than exponential smoothing.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined by the accompanying claims.

We claim:

1. A computerized method for forecasting intermittent demand for a lead time, comprising the steps of:
   providing a data set of intermittent data comprising a predetermined number of historical demand values;
   calculating lead time demand values for the lead time, wherein the calculating step comprises the step of sampling values from the historical demand values;
   summing the lead time demand values to provide a lead time demand sum; and
   repeating the calculating and summing steps a predetermined number of times to provide a distribution of lead time demand sums that forecast intermittent demand for inventory requirements.

2. The method of claim 1, wherein at least ten percent of the historical demand values are zero.

3. The method of claim 1, wherein the calculating step further includes the step of determining if a next lead time demand value is either zero or non-zero.

4. The method of claim 3, wherein the step of determining if the next lead time demand value is zero is accomplished with a Markov model.

5. The method of claim 3, wherein if the next lead time demand value is non-zero, the next lead time demand value is randomly chosen from among the non-zero historical demand values.

6. The method of claim 5, wherein a jittered lead time demand value is calculated as a random selection of an integer that is in a neighborhood of the lead time demand value.

7. The method of claim 6, wherein the jittered lead time demand value (S) is calculated as follows:

$$S=1+INT\{LTV+Z\ sqrt(LTV)\},$$

where INT calculates an integer value, Z is a normally distributed random value having a mean of 0 and variance of 1, and LTV is the lead time value.

8. The method of claim 7, wherein if $S \leq 0$, then S is forced to LTV.

9. The method of claim 1, further comprising the step of inputting the distribution into an inventory control system.

10. A program product, having a computer usable medium having computer readable code embodied therein that, when executed, comprises:
    means for examining intermittent data comprised of a predetermined number of historical demand values made up of zero and non-zero values;
    means for calculating lead time demand values for the lead time, wherein the calculating means samples values from the historical demand values;
    means for summing the lead time demand values to provide a lead time demand sum;
    looping means for generating a plurality of lead time demand sums;

storing means for storing the plurality of lead time demand sums; and means for providing the plurality of lead time demand sums that forecast inventory requirements.

11. The program product of claim 10, wherein the calculating means sequentially calculates the lead time values, and comprises:

means for determining if each lead time value to be calculated is zero or non-zero;

means for randomly assigning one of the non-zero historical demand values to each non-zero lead time value; and means for jittering each non-zero lead time value.

12. The program product of claim 11, wherein the means for determining if each lead time value to be calculated is zero or non-zero utilizes a Markov model.

13. The program product of claim 11, wherein the jittering means chooses a randomly selected integer that neighbors each non-zero lead time value.

14. The program product of claim 10, further comprising an inventory control means that receives as input the plurality of lead time demand sums.

15. The program product of claim 10, wherein the looping means loops N times, wherein N is a user defined value.

16. A computer system, comprising:

a processing unit;

a computer system memory accessible to the processing unit;

a data set comprising intermittent data stored within the computer system memory, wherein the intermittent data is comprised of a plurality of time series values;

a mechanism for examining the intermittent data; and a mechanism for generating a plurality of series of lead time demand values, wherein each series of lead time demand values is based upon at least one sampling selection from among the time series values.

17. The computer system of claim 16, wherein the program further comprises:

a mechanism for summing the lead time demand values within each series of lead time demand values to provide a plurality of lead time demand sums; and a mechanism for statistically analyzing the plurality of lead time demand sums.

18. The computer system of claim 16, wherein the generating mechanism determines if a next lead time demand value to be calculated is zero or non-zero.

19. The computer system of claim 18, wherein the generating mechanism randomly assigns a non-zero one of the plurality of time series values to the next lead time demand value if the next lead time demand value is calculated as non-zero.

20. The computer system of claim 16, wherein the generating mechanism comprises a jittering mechanism for altering lead time demand values to neighboring integer values.

21. The computer system of claim 16, wherein the at least one sampling selection randomly selects a single non-zero value.

22. The computer system of claim 16, wherein the at least one sampling selection selects a consecutive series of values.

23. A computerized method for generating a lead time demand (LTD) distribution for a lead time, comprising the steps of:

providing a data set of intermittent data comprising a predetermined number of historical demand values;

calculating subseries sums for the lead time based on the data set of intermittent data;

providing a cumulative distribution function (CDF);

calculating the LTD distribution based on the CDF and subseries sums; and providing the LTD distribution to manage product requirements.

24. The method of claim 23, wherein the CDF is a non-parametric function.

25. The method of claim 23, wherein the CDF is a parametric function.

26. The method of claim 25, wherein the CDF utilizes a lognormal probability density function.

27. The method of claim 25, wherein the CDF utilizes a normal probability density function.

28. The method of claim 23, further comprising the step of inputting the LTD distribution into an inventory control system.

29. A program product embodied on a computer usable medium, for generating a lead time demand (LTD) distribution, wherein said program product, when executed, comprises:

means for examining a data set of intermittent data comprising a predetermined number of historical demand values;

means for calculating subseries sums based on the data set of intermittent data;

means for calculating the LTD distribution based on a cumulative distribution function (CDF) and the subseries sums; and means for providing the LTD distribution to manage product requirements.

30. The program product of claim 29 further comprising an analysis means for reporting statistical summaries of the LTD distribution.

31. The program product of claim 29, further comprising an inventory control means for managing inventory based on the LTD distribution.

32. The program product of claim 29, wherein the CDF is nonparametric and is given as:

$$F^\wedge(0)=(\frac{1}{2}+\#\{=0\})/(1+\# \text{ total})$$

$$F^\wedge(X)=F^\wedge(0)+(1-F^\wedge(0))\cdot((\frac{1}{2}+\#\{\leq X \text{ and } >0\})/(1+\#\{>0\})), X>0,$$

and wherein X is a variable referring to the LTD.

33. The program product of claim 29, wherein the CDF is parametric and is given as:

$$F^\wedge(0)=(\frac{1}{2}+\#\{=0\})/(1+\# \text{ total})$$

$$F^\wedge(X)=F^\wedge(0)+(1-F^\wedge(0))*G^\wedge(X), X>0,$$

and wherein X is a variable referring to the LTD.

34. The program product of claim 33, wherein $G^\wedge(X)$ is estimated by integrating $g(X)$ from $-\infty$ to X, where $$g(X)=\{1/(Sqrt(2*Pi)*Sigma)\}*exp(-0.5*((X-Mu)/Sigma)^2),$$

and wherein X is a variable referring to the LTD, Sigma is a standard deviation and Mu is a mean.

35. The program product of claim 33, wherein $G^\wedge(X)$ is estimated by integrating $g(X)$ from $-\infty$ to X, where $$g(X)=\{1/(Sqrt(2*Pi)*Sigma*X)\}*exp(-0.5*((Ln(X)-Mu)/Sigma)^2),$$

and wherein X is a variable referring to the LTD, Sigma is a standard deviation and Mu is a mean.

36. An inventory management program product embodied on a computer usable medium, that, when executed, comprises:
- a forecast mechanism, the forecast mechanism including:,
  - means for examining intermittent data comprised of a predetermined number of historical demand values made up of zero and non-zero values;
  - means for calculating lead time demand values for a lead time, wherein the calculating means samples values from the historical demand values;
  - means for summing the lead time demand values to provide a lead time demand sum;
  - looping means for generating a plurality of lead time demand sums; and
  - storing means for storing the plurality of lead time demand sums on a computer system memory; and
- an inventory control mechanism, including:
  - means for reading the plurality of lead time demand sums; and
  - means for outputting inventory reorder information that specifies when a product order should be placed.

37. The program product of claim 36, wherein the calculating means sequentially calculates the lead time values, and comprises:
- means for determining if each lead time value to be calculated is zero or non-zero;
- means for randomly assigning one of the non-zero historical demand values to each non-zero lead time value; and
- means for jittering each non-zero lead value.

38. The program product of claim 36, wherein the inventory control mechanism further comprises means for outputting performance measures.

39. The program product of claim 36, wherein the inventory reorder information comprise a reorder point and an order quantity.

40. The program product of claim 36, wherein the inventory reorder information comprises a review interval and an order-up-to value.

41. The program product of claim 38, wherein the performance measures include inventory/order costs and service level percentages.

42. An inventory management program product embodied on a computer usable medium, that, when executed, comprises:
- a forecast mechanism, the forecast mechanism including:
  - means for examining a data set of intermittent data comprising a predetermined number of historical demand values;
  - means for calculating subseries sums based on the data set of intermittent data;
  - means for calculating a lead time demand (LTD) distribution based on a cumulative distribution function (CDF) and the subseries sums;
- an inventory control mechanism, including:
  - means for reading the plurality of lead time demand sums; and
  - means for outputting inventory reorder information that specifies when an order should be placed.

43. The program product of claim 42, wherein the inventory control mechanism further comprises means for outputting performance measures.

44. The program product of claim 42, wherein the inventory reorder information comprises a reorder point and an order quantity.

45. The program product of claim 42, wherein the inventory reorder information comprises a review interval and an order-up-to value.

46. The program product of claim 43, wherein the performance measures include inventory/order costs and service level percentages.

* * * * *